(12) United States Patent
Ondrus

(10) Patent No.: US 7,112,250 B2
(45) Date of Patent: Sep. 26, 2006

(54) METHOD FOR FORMING A JOINT

(75) Inventor: Daniel Joseph Ondrus, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/544,423

(22) Filed: Apr. 6, 2000

(65) Prior Publication Data
US 2003/0075256 A1 Apr. 24, 2003

(51) Int. Cl.
*B32B 41/00* (2006.01)
*B32B 31/00* (2006.01)

(52) U.S. Cl. .................. 156/64; 156/290; 156/291; 156/295

(58) Field of Classification Search ........... 156/157, 156/159, 290, 291, 295, 68; 296/29, 128
See application file for complete search history.

(56) References Cited

U.S. PATENT DOCUMENTS

| | | | | |
|---|---|---|---|---|
| 3,660,217 A | * | 5/1972 | Kehr et al. ............ | 428/118 |
| 4,759,489 A | * | 7/1988 | Pigott .................. | 228/102 |
| 4,803,124 A | * | 2/1989 | Kunz ................... | 428/200 |
| 5,181,747 A | | 1/1993 | Jovero ................. | 285/21 |
| 5,323,584 A | | 6/1994 | Scarlett .............. | 52/729 |
| 5,362,120 A | * | 11/1994 | Cornille ............. | 296/203 |
| 5,849,122 A | * | 12/1998 | Kenmochi ........... | 156/182 |
| 6,118,108 A | | 9/2000 | Ufford ................ | 219/535 |

OTHER PUBLICATIONS

Adhesives Handbook, 1970, The Chemical Rubber Co, First Edition, pp. 1-19, 28-31, 40-43, 94.*

* cited by examiner

*Primary Examiner*—George Koch
(74) *Attorney, Agent, or Firm*—Gary A. Smith

(57) ABSTRACT

A method 10 for forming a relatively stiff and/or a substantially tight joint 10, 30, 46 while concomitantly reducing the likelihood that the applied adhesive 12 will seep from the joint 10, 30, 46. In the preferred embodiment of the invention, the adhesive 12 is placed upon about one half of the coverage portion and upon about ten percent of the fillet portion of each coach and one-half coach joint 10, 30. The adhesive 12 is further placed upon at least fifty percent of the coverage portion 48 of a lap joint 46.

4 Claims, 1 Drawing Sheet

METHOD FOR FORMING A JOINT

FIELD OF THE INVENTION

This invention generally relates to a method for forming a joint and more particularly, to a method which selectively allows a tight joint to be formed by the use of an adhesive material while concomitantly reducing the likelihood that the adhesive material will "seep" or "run" out of the joint.

BACKGROUND OF THE INVENTION

A pair of members are typically required to be selectively interconnected at or along respective surfaces in order to allow these members to cooperatively form a desired assembly and/or to perform some desired overall function. Particularly, these interconnecting surfaces and members cooperatively form a "joint". Typically, three types of joints exist and/or are selectively formed and are respectively referred to as a "lap joint", a "one-half coach joint", and a "coach joint".

Particularly, a lap joint is formed by the selective interconnection of two substantially flat or planar members while a coach joint is formed by the selective interconnection of two arcuate members. The arcuate members cooperatively form a flared and open end. A one-half coach joint is formed by the selective interconnection of a substantially planar member and an arcuate member. Each of these joints is "tightened", "stiffened" or respectively secured or interconnected by the use of an adhesive material which selectively resides and/or is applied within the joint in a substantially "wet" state and allowed to cure. The cured adhesive then typically joins the various joint forming surfaces and allows the formed joint to perform a desired function.

While the adhesive material does desirably allow a relatively tight or stiff joint to be formed, it does frequently "seep" out of the joint and undesirably adhere to the joint-forming members or to other machinery, tools, or members in close proximity to the formed joint. Such seepage may cause damage to such machinery or members and may undesirably interfere with an overall manufacturing process. Moreover, since many such joints are typically formed during a manufacturing process, such seepage from all or a substantial number of these joints may greatly and undesirably reduce the efficiency of product production and increase the overall cost of the product manufacturing process.

Moreover, many business enterprises have not created and/or adopted a standardized method for forming a joint, thereby causing the various and respective manufacturing facilities of these business enterprises to produce joints having various "amounts of" or "degree of" stiffness, thereby increasing the variability of certain attributes of the products respectively produced by these business enterprises (i.e., overall product stiffness and/or reliability).

Traditionally, such seepage is substantially eliminated by the alternative use of other relatively costly and "mechanical" joint securing methods (i.e., by the use of fastening members) and/or by greatly diminishing the amount of the adhesive which is placed within the joint. While diminishing the amount of adhesive which is selectively placed within the joint does reduce seepage, it undesirably produces a relatively loose joint.

There is therefore a need for a method for forming a joint and for applying an adhesive within a joint which allows a relatively tight joint to be formed while concomitantly and substantially reducing the likelihood of seepage of the adhesive from the joint. There is further a need for a standardized method for forming a joint and/or for placing adhesive material within a joint, effective to allow and/or cause a business enterprise to consistently produce relatively stiff joints in a manner which overcomes at least some of the previously delineated drawbacks of prior methods and which substantially reduces the amount of variability associated with certain attributes and/or characteristics of the products produced by a business organization.

SUMMARY OF THE INVENTION

It is a first object of the present invention to provide a method for forming a joint which overcomes the various drawbacks of prior methods.

It is a second object of the present invention to provide a method for applying an adhesive within a joint which overcomes the various drawbacks of prior methods and which allows for the selective formation of a relatively tight joint while concomitantly reducing the likelihood of adhesive seepage from the joint.

It is a third object of the present invention to provide a method for applying an adhesive within a joint which overcomes the various drawbacks of prior methods and which allows for the selective formation of a relatively tight joint and which further reduces the likelihood of undesirable adhesive deposit.

It is a fourth object of the present invention to provide a method for applying adhesive within a joint which substantially maximizes the stress transfer characteristics of the joint while minimizing seepage.

It is a fifth object of the present invention to provide a standardized method for applying adhesive within a joint which is effective to allow and/or cause a business enterprise to produce relatively tight joints in a relatively consistent and/or uniform manner.

According to a first aspect of the present invention, a method for applying adhesive within an assembly of the type having a certain coverage portion and a certain fillet portion is provided. The method includes the step of applying the adhesive within the assembly, effective to cause the applied adhesive to be deposited upon about fifty percent of the coverage portion of the assembly and upon about ten percent of the fillet portion of the assembly, thereby forming a joint.

These and other features, aspects, and embodiments of the invention will be apparent by a reading of the following detailed description of the preferred embodiment of the invention and by reference to the following drawings.

DETAILED DESCRIPTION OF THE PREFERRED EMBODIMENT OF THE INVENTION

Figure 2:
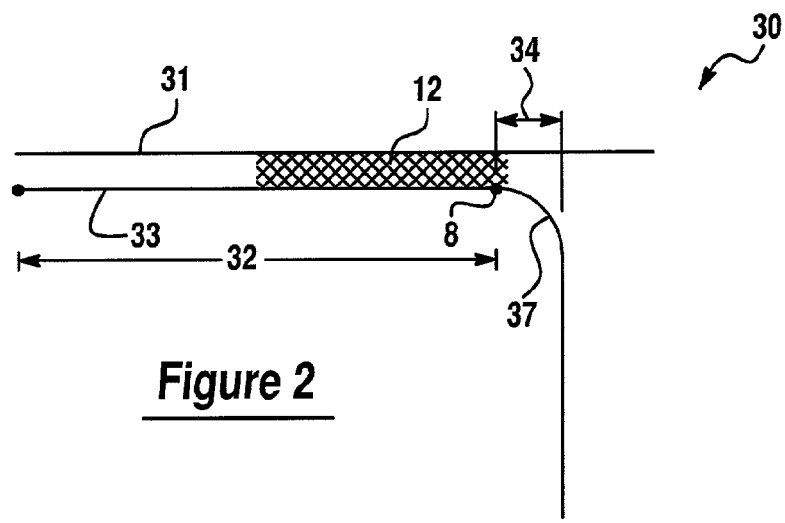
FIG. 2 is a side view of a typical one-half coach joint having adhesive material which has been applied according to the methodology of the preferred embodiment of the invention.
Figure 3:
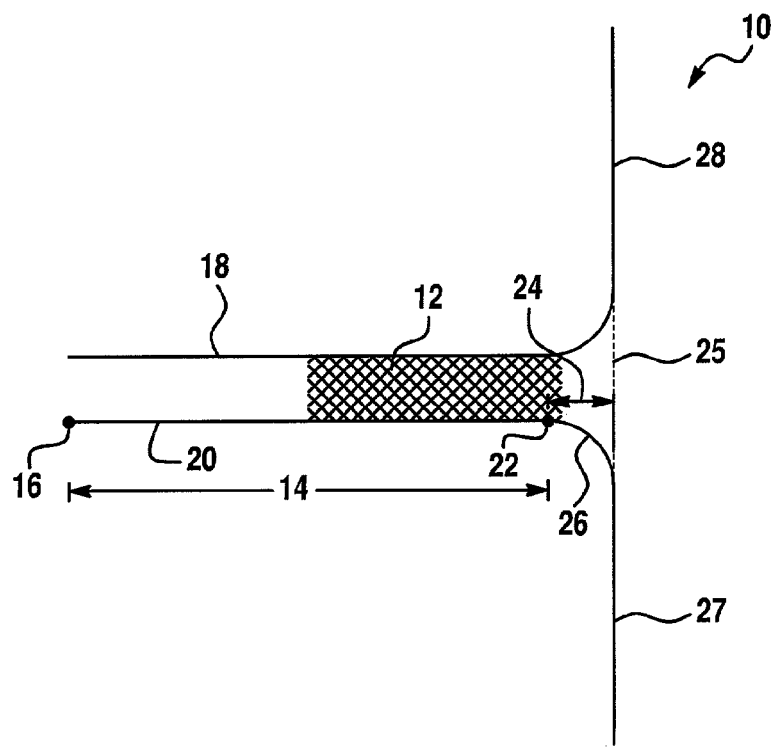
FIG. 3 is a side view of a typical coach joint having adhesive material which has been applied according to the methodology of the preferred embodiment of the invention.

Referring now to FIG. 3, there is shown a typical full coach joint 10 which has been formed by use of adhesive 12 according to the teachings of the methodology of the preferred embodiment of the invention. Particularly, joint 10 includes a first dimension or portion which is conventionally referred to as the "flange coverage" dimension or length 14 and which extends along first member 20 from a point 16 at a first end of the member 20, to a point 22 at which the member 20 begins to curve or form a "tangent portion" 26. Joint 10 further includes a second dimension, portion, or length 24 which is referred to as the "flange fill" or "fill" dimension or portion and which extends from point 22 to a line or segment 25 which is substantially colinear to curved or "tangent" portions 26, 28 of respective joint-forming members 18, 20. Similarly, the one half coach joint 30, shown in FIG. 2, also has a coverage length or dimension 32 and a fill dimension or length 34, each of which terminate at point 8 at which member 33 begins to curve or form a tangent portion.

In the preferred embodiment of the invention, adhesive 12 is deposited along about ten percent of the flange fillet length or portion 24 and about fifty percent of the flange coverage length or portion, 14. Similarly, for the one half coach joint embodiment of FIG. 2, adhesive 12 is made to occupy about fifty percent of the coverage length 32 and about ten percent of the fillet length 34. In this manner, the applied adhesive interconnects member 18 to member 20 to form joint 10 and interconnects member 33 to member 31 to form joint 30.

Figure 1:
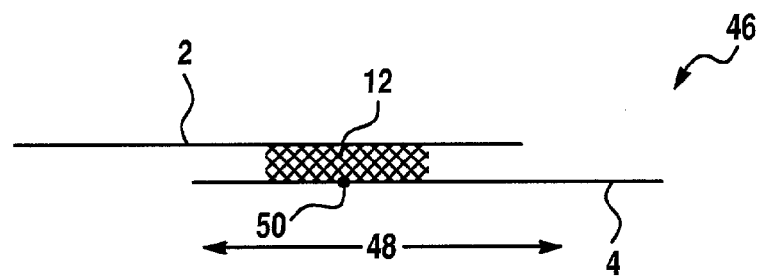
FIG. 1 is a side view of a typical lap type joint having adhesive material which has been applied according to the methodology of the preferred embodiment of the invention.

For the lap joint embodiment, shown in FIG. 1, the adhesive 12 covers or resides along a distance which is about equal to about fifty to about seventy-five percent of the total coverage length 48 which is defined to be the length of overlap of members 2 and 4. Particularly, in one non-limiting embodiment, adhesive 12 is placed or deposited on the center point 50 of the length 48 and made to extend in a substantially equal length in each direction from the center point 50, thereby interconnecting member 2 to member 4 in order to form joint 46. In this manner, the respective joints 10, 30, 46 may be tightly formed while concomitantly preventing and/or substantially reducing the likelihood of adhesive seepage.

In the foregoing manner, the present method maximizes the stress transfer characteristics of the resulting joints 10, 30, 46, while substantially minimizing the seepage of adhesive 12. In one non-limiting embodiment, members 18, 20 comprise portions or members of a vehicle or the body of a vehicle.

It should be realized that the invention is not limited to the exact construction which has been described above, but that various changes may be made without departing from the spirit and the scope of the invention as is more fully delineated within the following claims. It should be further appreciated that the adoption of these previously delineated "joint forming" standards by a business enterprise allows the business enterprise to consistently form relatively tight joints in a consistent manner and reduces the amount of undesirable attribute/characteristic variability within the products produced by the business enterprise.

What is claimed is:

1. A method of repetitively forming a coach joint between two members during a manufacturing process using a viscous adhesive, said method comprising the steps of:

positioning a first member initially having a generally planar portion and an arcuate portion at a second end of the planar portion to be in contact with a second member to form a coach joint during the manufacturing process, wherein the joint is defined by both a coverage portion having a coverage length extending along a length of the first member from a first point at a first end of the first member to a second point at the second end at which the first member begins to curve to form a tangent portion, and a flange fill portion having a flange fill length extending from the second point to a line segment that is collinear to the tangent portion;

depositing the viscous adhesive in about fifty percent of the coverage length and in about ten percent of the fill length to repetitively form the joint between the first member with the second member during the manufacturing process, so that seepage of the adhesive from the joint is a minimum while stress transfer is a maximum.

2. A method as set forth in claim 1 wherein the joint is a full coach joint, and the second member initially includes a generally planar portion and an arcuate portion at a second end of the planar portion.

3. A method as set forth in claim 1 wherein the joint is a one-half coach joint.

4. A method of repetitively forming a lap joint between two members using a viscous adhesive during a manufacturing process, said method comprising the steps of:

positioning a first generally planar member to overlap a second generally planar member to form a lap joint during the manufacturing process, wherein the joint includes a coverage portion defined by a length of overlap between the first member and the second member; and depositing the viscous adhesive initially at a center point for the coverage length so that the adhesive extends between fifty to seventy-five percent of the coverage length, and is equidistant from the center point, to repetitively interconnect the first member and the second member for each joint during the manufacturing process, so that seepage of the adhesive from the joint is a minimum value while stress transfer of the joint is a maximum.

* * * * *